(12) United States Patent
Millet et al.

(10) Patent No.: US 11,136,955 B2
(45) Date of Patent: Oct. 5, 2021

(54) DEVICE FOR A COMMON RAIL FUEL INJECTION SYSTEM

(71) Applicant: VOLVO TRUCK CORPORATION, Gothenburg (SE)

(72) Inventors: Guillaume Millet, Condrieu (FR); Yannick Sailler, Lyons (FR); Julien Bouchot, Vienne (FR); Clement Starc, Chassieu (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/769,287

(22) PCT Filed: Dec. 8, 2017

(86) PCT No.: PCT/IB2017/001719
§ 371 (c)(1),
(2) Date: Jun. 3, 2020

(87) PCT Pub. No.: WO2019/111031
PCT Pub. Date: Jun. 13, 2019

(65) Prior Publication Data

US 2020/0291911 A1 Sep. 17, 2020

(51) Int. Cl.
*F02M 55/02* (2006.01)
*F02M 63/02* (2006.01)
(Continued)

(52) U.S. Cl.
CPC .... *F02M 63/0275* (2013.01); *F02M 37/0052* (2013.01); *F02M 55/005* (2013.01);
(Continued)

(58) Field of Classification Search
CPC .... F02M 55/025; F02M 55/005; F02M 55/04; F02M 69/465; F02M 61/168; F02M 61/14; F02M 63/0275; F02M 37/0052
See application file for complete search history.

(56) References Cited

U.S. PATENT DOCUMENTS 5,086,743 A * 2/1992 Hickey ............... F02D 41/3005
123/456
5,168,857 A * 12/1992 Hickey ............. B29C 45/14639
123/456

(Continued)

FOREIGN PATENT DOCUMENTS

DE        19945436 C1    1/2001
DE     102005026993 A1  12/2006
(Continued)

OTHER PUBLICATIONS

International Search Report and Written Opinion dated Aug. 21, 2018 in corresponding International PCT Application No. PCT/IB2017/001719, 10 pages.

*Primary Examiner* — Gonzalo Laguarda
(74) *Attorney, Agent, or Firm* — Venable LLP; Jeffri A. Kaminski

(57) ABSTRACT

The invention relates to a device (10) for a common rail fuel injection system (102), wherein the device (10) comprises a one-piece module (12) which comprises a common fuel line (14) and a plurality of injector bodies (16) in fluid communication with the common fuel line (14). The present invention also relates to a vehicle (100) comprising such a device (10). The present invention also relates to a method of manufacturing a device (10) for a common rail fuel injection system (102).

19 Claims, 7 Drawing Sheets

(51) Int. Cl.
*F02M 37/00* (2006.01)
*F02M 55/00* (2006.01)
*F02M 55/04* (2006.01)
*F02M 61/14* (2006.01)
*B33Y 80/00* (2015.01)

(52) U.S. Cl.
CPC .......... *F02M 55/025* (2013.01); *F02M 55/04* (2013.01); *F02M 61/14* (2013.01); *B33Y 80/00* (2014.12); *F02M 63/0265* (2013.01); *F02M 2200/856* (2013.01); *F02M 2200/857* (2013.01)

(56) References Cited

U.S. PATENT DOCUMENTS

| | | | |
|---|---|---|---|
| 9,791,153 B2 * | 10/2017 | Dai | ............................ F23R 3/60 |
| 10,408,178 B2 * | 9/2019 | Spurling | .............. F02M 55/025 |
| 2003/0154961 A1 | 8/2003 | Liskow | |
| 2015/0136084 A1 * | 5/2015 | Maier | .................... F02M 55/02 123/452 |

FOREIGN PATENT DOCUMENTS

| | | |
|---|---|---|
| DE | 102011086209 A1 | 5/2013 |
| DE | 102016012080 A1 | 4/2017 |
| EP | 0387504 A1 | 9/1990 |
| EP | 0487198 A1 | 5/1992 |
| EP | 1063420 A2 | 12/2000 |
| WO | 2004036028 A1 | 4/2004 |

* cited by examiner

DEVICE FOR A COMMON RAIL FUEL INJECTION SYSTEM

CROSS-REFERENCE TO RELATED APPLICATIONS

This application is a U.S. National Stage application of PCT/IB2017/001719, filed Dec. 8, 2017, and published on Jun. 3, 2019, as WO 2019/111031 A1, all of which is hereby incorporated by reference in its entirety.

TECHNICAL FIELD

The invention relates to a device for a common rail fuel injection system, a vehicle comprising such a device, and a method of manufacturing a device for a common rail fuel injection system.

The invention can be applied in heavy-duty vehicles, such as trucks, buses and construction equipment. The invention can also be applied in marine applications and in cars, for example. Although the invention will be described with respect to a truck, the invention is not restricted to this particular vehicle.

BACKGROUND

Common rail systems are used for direct fuel injection for internal combustion engines. The name common rail system refers to that there is a common rail which supplies multiple injectors with fuel.

A typical common rail system comprises a high pressure pump delivering fuel via a high pressure line to the common rail (accumulator), which in turn delivers fuel via a plurality of high pressure pipes to multiple injectors. The system may for example comprise six injectors, six high pressure pipes, and one common rail (for a 6-cylinder engine). In addition, the system may comprise yokes to hold the injectors, brackets to hold the common rail, clamps to maintain the high pressure pipes, sealings, etc.

With the typical common rail system, notwithstanding the high pressure pump, several parts need to be assembled in the engine plant, which takes time. Also, several high pressure joints (potential leakages sources) have to be secured. Furthermore, the complete assembly may require significant space, driven by the space claim of the individual parts (for example individual high pressure pipes minimum bending radius and straight lengths) and by the space reserved for tool access. The considerations above also apply to aftermarket services.

In WO 2004/036028, a fuel distributor comprising a pressure accumulator for receiving statically compressed pressurized fuel is provided with at least one transversal bore leading into the pressure accumulator and is produced by deformation, especially casting. Hence, WO 2004/036028 appears to have cast the aforementioned common rail and high pressure pipes in one piece.

SUMMARY

An object of the invention is to provide a device for a common rail system, which device overcomes or at least mitigates at least some of the above mention problems.

According to a first aspect of the invention, the object is achieved by a device according to claim 1. According to a second aspect of the invention, the object is achieved by a vehicle according to claim 15. According to a third aspect, the object is achieved by a method according to claim 16.

According to the first aspect of the invention, a device for a common rail fuel injection system is provided. The device comprises a one-piece module which comprises a common fuel line and a plurality of injector bodies in fluid communication with the common fuel line.

The present invention is based on the realization that the common fuel line, corresponding to a common rail, and the injector bodies can be made in one-piece. This allows for a compact module, with decreased space claim, for optimized installation in an engine environment. The one-piece module may drastically reduce assembly time and risks for leakages at high pressure joints. Also, the weight may be reduced because of less components or parts.

The term "one-piece" here means that the module consists of or is made in a single undivided piece.

According to at least one example embodiment of the invention, the one-piece module is made by additive manufacturing (also referred to as 3D printing). The term "additive manufacturing" refers to a manufacturing method where the component, or in this case the module, is built up adding the material or materials layer-by-layer in contrast to a subtractive manufacturing method where the material is removed in order to form the component. Technologies for additively manufacturing the present one-piece module comprise but are not limited to selective laser sintering (SLS), direct metal laser sintering (DMLS), and selective laser melting (SLM). The one-piece module can comprise or be made of metal or alloy, such as titanium or (stainless) steel. Additive manufacturing may facilitate varying the wall thickness and/or local shapes of the module to meet local requirements in the module.

According to at least one example embodiment of the invention, the common fuel line has at least one curved portion between each injector body. The common fuel line may for example have an undulating ("wavy") shape in a plane perpendicular to the longitudinal direction of each injector body. Alternatively, the common fuel line may have an undulating ("wavy") shape in a plane parallel to the longitudinal direction of each injector body. An advantage of the undulating shape is that the stiffness of the common fuel line from one injector body to the next in a longitudinal direction (x) of the common fuel line may be decreased, which in turn may decrease static stress when the one-piece module is mounted to an engine or engine component. Also, the undulating shape may facilitate placing the one-piece module relative to other components such as valve springs which may be arranged around the injector bodies.

According to at least one example embodiment of the invention, the injector bodies are fluidly connected in series along the common fuel line. In such an embodiment, there is a direct feed from one injector body to another. The term "fluidly connected" refers to how the injector bodies are being supplied with fuel. Arranging the injector bodies such that they are fluidly connected in series may allow a more compact one-piece module.

According to at least one example embodiment of the invention, the one-piece module further comprises a plurality of individual fuel lines, wherein each individual fuel line is provided between the common fuel line and a respective injector body. In such an embodiment, there is a parallel feed to all injector bodies. In other words, the injector bodies are fluidly connected in parallel.

According to at least one example embodiment of the invention, each individual fuel line comprises a channel with a local channel restriction adapted to act as a wave damper. The channel restrictions may act as "local throttle" to manage the internal hydraulics between the common fuel line and the injector bodies. The local channel restrictions may beneficially be provided by means of additive manufacturing.

According to at least one example embodiment of the invention, the common fuel line comprises a high-pressure inlet channel. The high-pressure inlet channel may be adapted to contain and deliver high-pressure fuel, in other words pressurized fuel, from a pump of the common rail system to the injector bodies, optionally via the aforementioned individual fuel lines. The high-pressure inlet channel may for example be adapted to contain fuel having a pressure in the range of 200 to 3000 bar, in operation.

According to at least one example embodiment of the invention, the common fuel line further comprises at least one low-pressure return channel. In this way, injector leakage return flows may be managed internally in the one-piece module, without needing separate return lines. Hence, the number of pipes around the engine or under the valve cover may be reduced. The at least one low-pressure return channel may be adapted to contain fuel having a pressure in the range of 0 to 20 bar, such as (approximately) 5 bar, in operation.

Furthermore, additive manufacturing of the common fuel line of this embodiment allows the common fuel line to have a complex shape for separating the at least two channels for fuel of different pressures while maintaining a small outer diameter. For example, the at least one low-pressure return channel may be two low-pressure return channels, each at least partly surrounding the high-pressure inlet channel in a circumferential direction. Having two separated low-pressure return channels can enable provision of an "active" backflow circuit wherein the flow is forced to circulate in order to accelerate hot fuel backflow evacuation from the injector bodies and thus have a better thermal management.

According to at least one example embodiment of the invention, the device further comprises a connector connected to one end of the common fuel line, wherein the connector comprises a first central passage adapted to deliver high-pressure fuel to the high-pressure inlet channel of the common fuel line and at least one second peripheral low-pressure passage adapted to receive fuel from the at least one low-pressure return channel of the common fuel line, wherein the transition between the first central passage and the high-pressure inlet channel is sealed by a conical connection, and wherein the transition between the at least one second peripheral low-pressure passage and the at least one low-pressure return channel is sealed by at least one O-ring and a nut, which nut interconnects the connector and said end of the common fuel line. This connector may be very compact while handling fuels of different pressures. Further, there is no need for several connectors and thereby may assembly time and cost be reduced. Other advantages with this combined connector is that the weight may be reduced. The connector can be made by additive manufacturing.

According to at least one example embodiment of the invention, the device further comprises a plurality of yokes, wherein each yoke comprises a cylindrical portion and an attachment portion attachable to an engine or engine component, wherein each of the injector bodies has a portion which is thinner than surrounding portions of the injector body, wherein the cylindrical portion of each yoke is loosely fitted around said portion but caged by said surrounding portions of a respective injector body, and wherein each yoke is made in one piece by additive manufacturing. "[L]oosely fitted around said portion but caged by said surrounding portions" basically means that the yoke is allowed to have a limited movement relative to the injector body. The present yokes may have the same degrees of freedom as conventional yokes, which facilitates installation of the present device, but the present yokes are also unlosable as they are made in one piece. In other words, the present yokes are "integrated" with the injector bodies. Instead of the yokes each made in one piece by additive manufacturing, the present one-piece module could be used with conventional yokes.

According to at least one example embodiment of the invention, the cylindrical portion of each yoke is built around said portion during the additive manufacturing of the yoke. Hence, there is no extra manufacturing steps for attaching the yokes to the injector bodies.

According to at least one example embodiment of the invention, each of the injector bodies includes an internal high-pressure fuel reserve cavity. The internal high-pressure fuel reserve cavity is for supplying fuel to an injector nozzle. The internal high-pressure fuel reserve cavity allows having a volume of fuel closer to the injector nozzle, for better control of the combustion and the injected fuel quantity. In addition, the internal high-pressure fuel reserve cavity allows for better control of the pressure during injection, which pressure should be kept stable or constant. Furthermore, additive manufacturing of the injector bodies of this embodiment allows the internal high-pressure fuel reserve cavity to handle the pressure of the fuel in the internal high-pressure fuel reserve cavity. Furthermore, the internal high-pressure fuel reserve cavities allow reduction of the common fuel line.

According to a second aspect of the invention a vehicle is provided. The vehicle comprises a device according to the first aspect. The vehicle may for example be a truck, a bus, construction equipment, a boat or a car.

According to a third aspect of the invention, a method of manufacturing a device for a common rail fuel injection system is provided. The method comprises the step of: additively manufacturing a one-piece module of the device, which one-piece module comprises a common fuel line and a plurality of injector bodies in fluid communication with the common fuel line.

Effects and features of this third aspect of the present invention are largely analogous to those described above in connection with the first aspect (and the second aspect) of the invention. Embodiments mentioned in relation to the first and the second aspects of the present invention are largely compatible with the third aspect of the invention.

According to at least one example embodiment of the invention, the method further comprising the step of: additively manufacturing a one-piece yoke for each injector body, wherein each yoke comprises a cylindrical portion and an attachment portion attachable to an engine or engine component, and wherein the cylindrical portion of each yoke is built around a portion of the injector body which is thinner than surrounding portions of the injector body, such that the cylindrical portion of each yoke is loosely fitted around said portion but caged by said surrounding portions of the injector body.

According to at least one example embodiment of the invention, the one-piece module and the yokes are manufactured simultaneously, i.e. typically in the same machine during the same printing session.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

In the following, embodiments of the present invention will be discussed with reference to the accompanying figures. It should be noted that this detailed description by no means limits the scope of the invention. The scope of the invention is defined by the appended claims. Further, that specific features are mentioned in connection to an embodiment of the invention does not mean that those features cannot be used to an advantage together with other embodiments of the invention.

Figure 1:
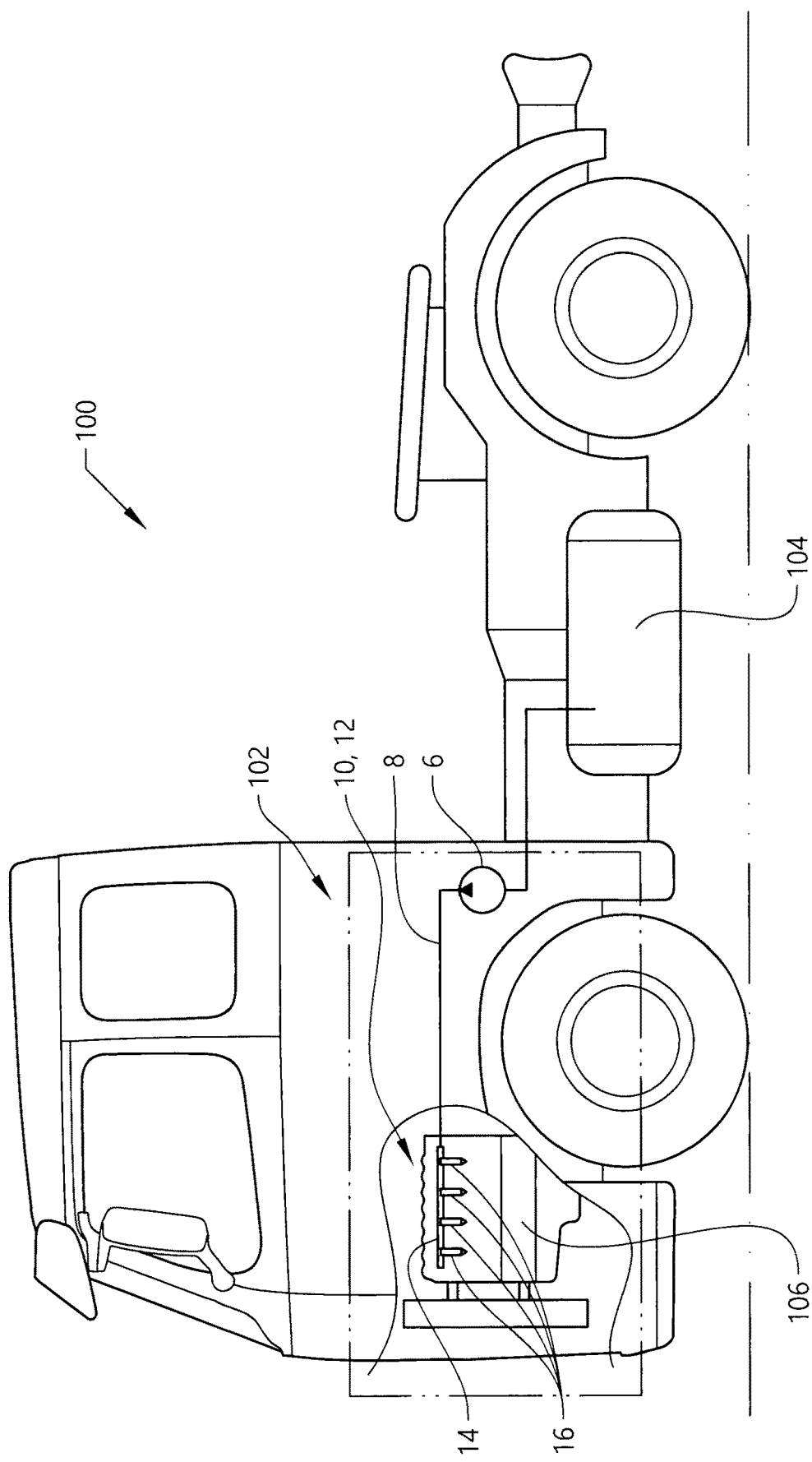
FIG. 1 is a schematic side view of a truck in accordance with at least one embodiment of the invention.

FIG. 1 shows a truck 100 comprising a common rail fuel injection system 102, a fuel tank 104 and an internal combustion engine 106, for example a diesel engine. The common rail fuel injection system 102 comprises a pump 6, a high-pressure line 8 and a device 10 comprising a one-piece module 12. The one-piece module comprises a common fuel line ("common rail") 14 and a plurality of injector bodies 16. The plurality of injector bodies 16 are arranged in fluid communication with the common fuel line 14. Here, the one-piece module comprises four injector bodies 16, but it may in some embodiments be another number of injector bodies 16, e.g. six injector bodies 16. The number of injector bodies 16 may be equal to the numbers of cylinders of the internal combustion engine 106. Additional components, e.g. coils, electrical connections, valves, needles, nozzles, may be mounted to or provided inside the injector bodies 16. The components may be mounted to or provided inside the injector bodies 16 after the one-piece module 12 has been manufactured, but before the one-piece module 12 is installed in the truck 100.

The one-piece module 12 consists of or is made in a single undivided piece. The one-piece module 12 is made by additive manufacturing (3D printing). Technologies for additively manufacturing the one-piece module 12 comprise but are not limited to selective laser sintering (SLS), direct metal laser sintering (DMLS), and selective laser melting (SLM). The one-piece module 12 can comprise or be made of metal or alloy, such as titanium or (stainless) steel. The material may be selected in order to be resistant enough so that the one-piece module 12 can hold the very high pressure, but eventually "flexible enough" so that it decreases the longitudinal stiffness of the whole one-piece module 12.

Figure 2A:
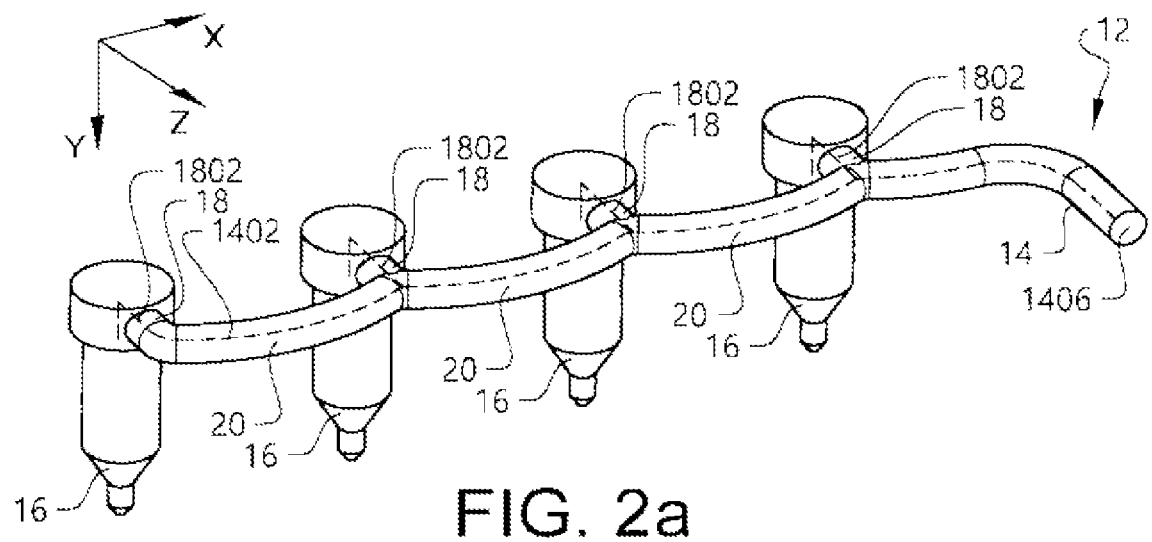
FIG. 2a is a schematic, perspective view of a one-piece module in accordance with at least one embodiment of the invention.

The one-piece module 12, according to at least an embodiment, is shown in FIGS. 2a (perspective view) and 2b (top view). The one-piece module 12 here comprises a plurality of individual fuel lines 18. Each of the individual fuel lines 18 is provided between the common fuel line 14 and a respective one of the plurality of injector bodies 16. Namely, each individual fuel line 18 comprises a channel 1802 in fluid communication with a high-pressure inlet channel 1402 of the common fuel line 14. Hence, the injector bodies 16 are fluidly connected in parallel.

The channels 1802 may comprise a local channel restriction (not shown) adapted to act as a wave damper. For example, the channel restrictions may act as "local throttle" to manage the internal hydraulics between the common fuel line 14 and the injector bodies 16. The local channel restrictions may beneficially be provided by means of the additive manufacturing.

Figure 2B:
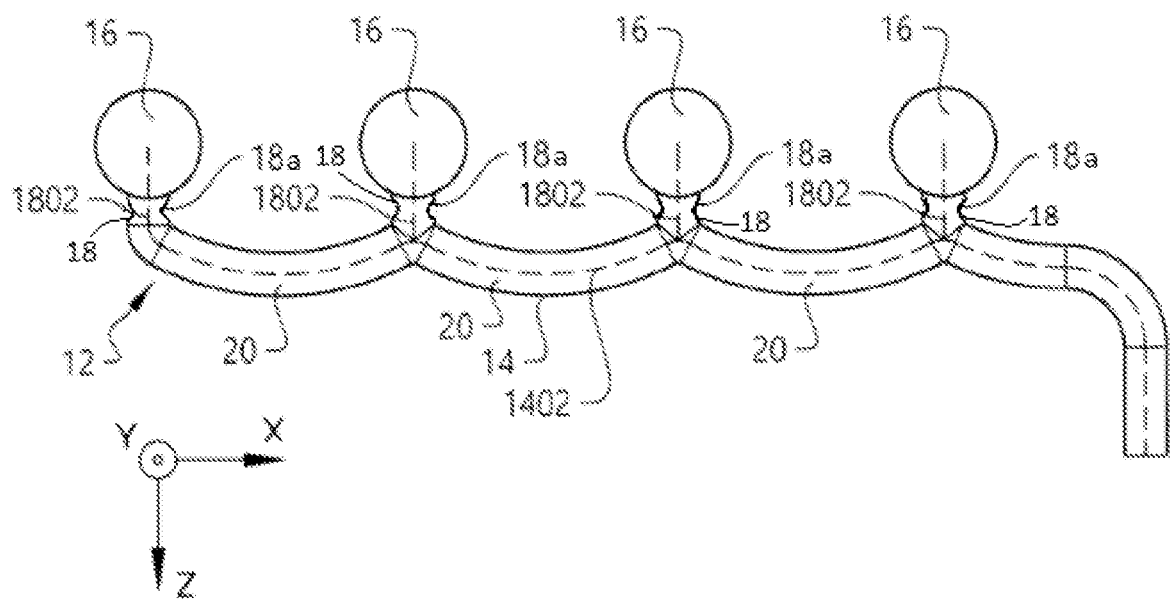
FIG. 2b is a schematic, top view of a one-piece module in accordance with at least one embodiment of the invention.

Directions and extensions of the one-piece module 12 will below be discussed using a coordinate system which is shown in FIGS. 2a and 2b. The x-direction is parallel to the main extension of the common fuel line 14. The y-direction is parallel to the longitudinal direction of the injector bodies 16. The z-direction is perpendicular both to the main extension of the common fuel line 14 and the longitudinal extension of the injector bodies 16. Further, the z-direction may be parallel to the individual fuel lines 18.

The common fuel line 14 of the one-piece module 12 may have a curved portion 20 between each of the injector bodies 16, resulting for example in an undulating shape in the plane formed by the above-defined x- and z-directions as illustrated. Here, each curved portion 20 is u-shaped. When looking the z-direction, the "u" is turned in the same direction between the injector bodies. In a variant (not shown), the common fuel line 14 may have an undulating ("wavy") shape in the xy plane. Alternatively, the common fuel line 14 could be straight between each of the injector bodies 16. It should be understood that size and/or shape of the one-piece module 12 as well as the common fuel line 14 and the plurality of the injector bodies 16 may be varied in order to meet the demands of vehicles other the truck 100, e.g. other heavy vehicles or in cars.

When in use, fuel stored in the tank 104 is pressurized and delivered by the pump 6 via the high-pressure line 8 to the high-pressure inlet channel 1402 of the common fuel line 14. Subsequently, the high-pressure inlet channel 1402 of the common fuel line 14 supplies each of the plurality of injector bodies 16 with said pressurized fuel via the channels 1802 of the individual fuel lines 18, which fuel may be injected in the internal combustion engine 102.

Figure 3:
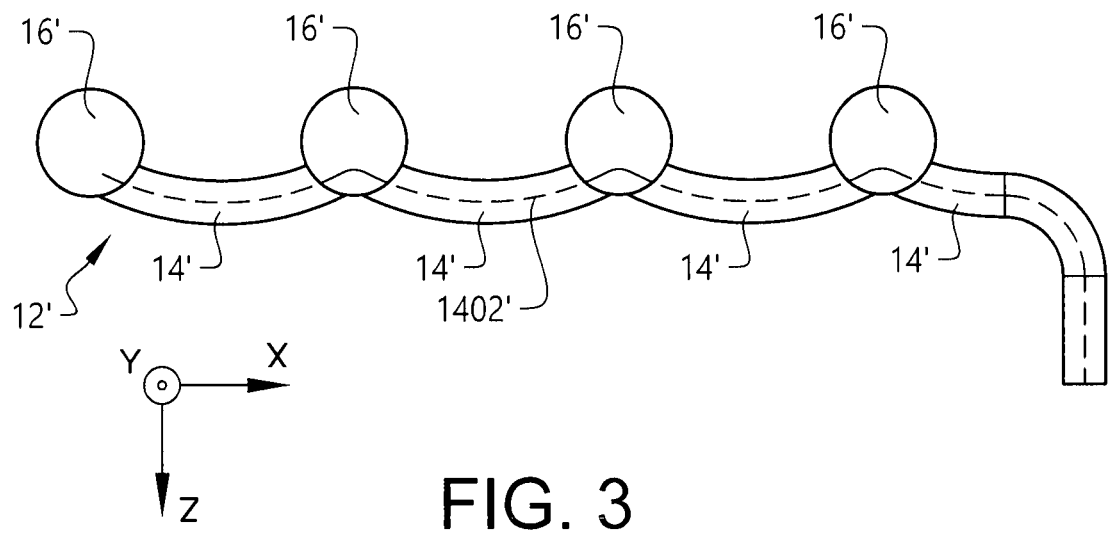
FIG. 3 is a schematic, top view of a one-piece module in accordance with at least one embodiment of the invention.

FIG. 3 shows a top view of a one-piece module 12' according to at least one example embodiment of the invention. Similar to the one-piece module 12, the one-piece module 12' comprises a common fuel line 14' and a plurality of injector bodies 16'. The common line 14' comprises a high-pressure inlet channel 1402'. The high-pressure inlet channel 1402 passes through each of the plurality of the injector bodies 16'. Here, the plurality of injector bodies 16' is fluidly connected in series along the common fuel line 14'. Hence when in use, fuel is first supplied to the rightmost injector body 16' in FIG. 3, then to the next injector body 16' to the left (or downstream of) the rightmost injector body 16', and so on. There are no individual fuel lines similar to the individual fuel lines 18 in FIGS. 2a and 2b. Further, the common fuel line 14' may in FIG. 3 be undulating, similar to FIGS. 2a and 2b, or it could be straight, for example.

Figure 4:
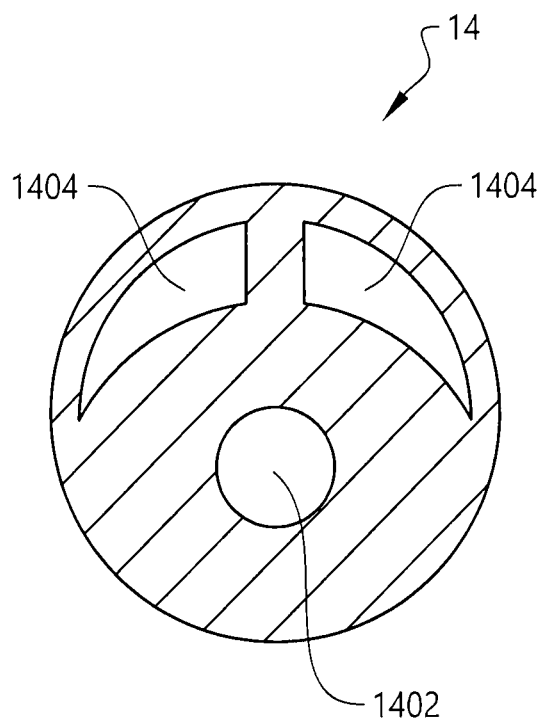
FIG. 4 is a schematic, cross-sectional view of a common fuel line in accordance with at least one embodiment of the invention.

FIG. 4 shows a cross-section of the common fuel line 14 according to one or more embodiments of the invention. In addition to the high-pressure inlet channel 1402, the common fuel line 14 may also comprise at least one low-pressure return channel 1404. In FIG. 4, the common fuel line 14 comprises two low-pressure return channels 1404. The common fuel line 14 of FIG. 4 may have an outer diameter in the range of 10 to 30 mm. The cross-section of the high-pressure inlet channel 1402 is circular, whereas the low-pressure return channels 1404 here has a non-circular cross-section. The high-pressure inlet channel 1402 may have a diameter of 3-5 mm. The combined cross-sectional shape of the two low-pressure return channels 1404 may be described as a split crescent. The high-pressure inlet channel 1402 is arranged in the center or close to the center of the common fuel line 14. The two low-pressure 1404 return channels are arranged such that they partially surround the high-pressure inlet channel 1402. The relative positions of the high-pressure inlet channel 1402 and the two low-pressure return channels 1404 may be the same throughout the length of the common fuel line 14. In other words, the two low-pressure return channels 1404 are not twisted around the high-pressure inlet channel 1402. In yet other words, the cross-section of the common fuel line 14 may have the same appearance, i.e. it may be uniform, throughout the length of the common fuel line 14. As part of the one-piece module 12, the common fuel line 14 of FIG. 4 may be additively manufactured (3D printed). In alternative design (not shown), each of the low-pressure return channels 1404 may have a semi-cylinder shape. In yet another design (not shown), the common fuel line 14 may have only one circular low-pressure return channels 1404 arranged next to and parallel to the high-pressure inlet channel 1402.

According to some embodiments, when the common fuel line comprises the high-pressure inlet channel 1402 and the at least one low-pressure return channel 1404, the aforementioned channel 1802 of each of the individual fuel lines 18 may be a high-pressure channel 1802, and each individual fuel lines 18 may further comprise at least one low-pressure channel "corresponding" to the at least one low-pressure return channel 1404.

When in use, the low-pressure return channel 1404 is used for transporting low-pressure fuel out from the injector bodies 16, possibly via the low-pressure channels of any individual fuel lines 18, and back to the fuel tank 104. The low-pressure fuel may for example be due to injector leakages. Instead of managing return fuel internally, separate return lines could be used.

Figure 5:
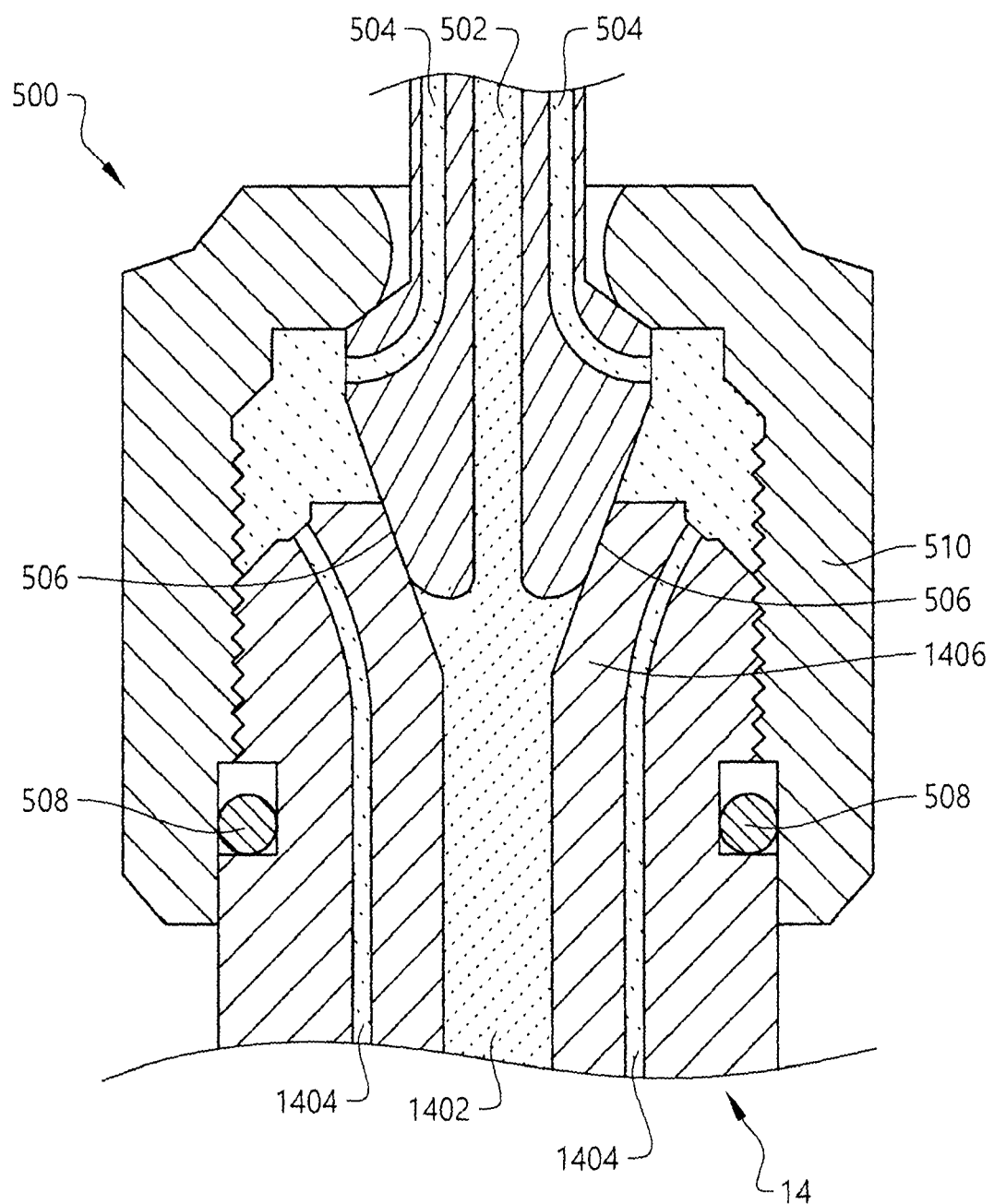
FIG. 5 is a schematic, cross-sectional view of a connector in accordance with at least one example embodiment of the invention.

The device 10 may further comprise a connector 500. The connector 500 is shown in cross-section in FIG. 5. The connector 500 may be connected to one end 1406 of the common fuel line 14 of FIG. 4. When connected, said end 1406 of the common fuel line 14 may constitute a female part whereas the connector 500 may constitute a male part. The connector 500 comprises a first central passage 502. The first central passage 502 is adapted to deliver or provide high-pressure fuel (for example >1800 bar) to the high-pressure inlet channel 1402. The connector 500 further comprises at least one second peripheral low-pressure passage 504. The at least one second peripheral low-pressure passage 504 is adapted to receive fuel (for example <300 bar) from the at least one low-pressure return channel 1404 of the common fuel line 14. In FIG. 5, the connector 500 comprises two second peripheral low-pressure passages 504, "matching" the two low-pressure return channels 1404 of the common fuel line 14 of FIG. 4. The transition between the first central passage 502 and the high-pressure inlet channel 1402 is sealed by a conical connection 506. The transition between the second peripheral low-pressure passage(s) 504 and the low-pressure return channel(s) 1404 is sealed by an O-ring 508 and a nut 510. The nut 510 interconnects the connector 500 and said end 1406 of the common fuel line 14. The connector 500 may be additively manufactured, as described above in relation of the one-piece module 12. Furthermore, the connector 500 may be referred to as a two-in-one connector, in that it can handle two different fluids.

When the connector 500 is being connected to the common fuel line 14, the connector 500 is brought in contact with the high-pressure inlet channel 1402, forming the conical connection 506. The conical connection 506 may be metal-to-metal contact, and it is secured by the nut 508 as the latter is tightened. Furthermore, the transition between the second peripheral low-pressure passage(s) 504 and the low-pressure return channel(s) 1404 may be sealed by metal-to-metal contact between (the back of) the connector 500 and the nut 510 at one end, and by the O-ring 508 at the other end, as illustrated in FIG. 5. The conical connection 506 at the front and the metal-to-metal contact between the back of the connector 500 and the nut 510 can be designed such that the connector 500 may be tilted or inclined some degrees relative to the high-pressure inlet channel 1402/common fuel line 14.

Figure 6:
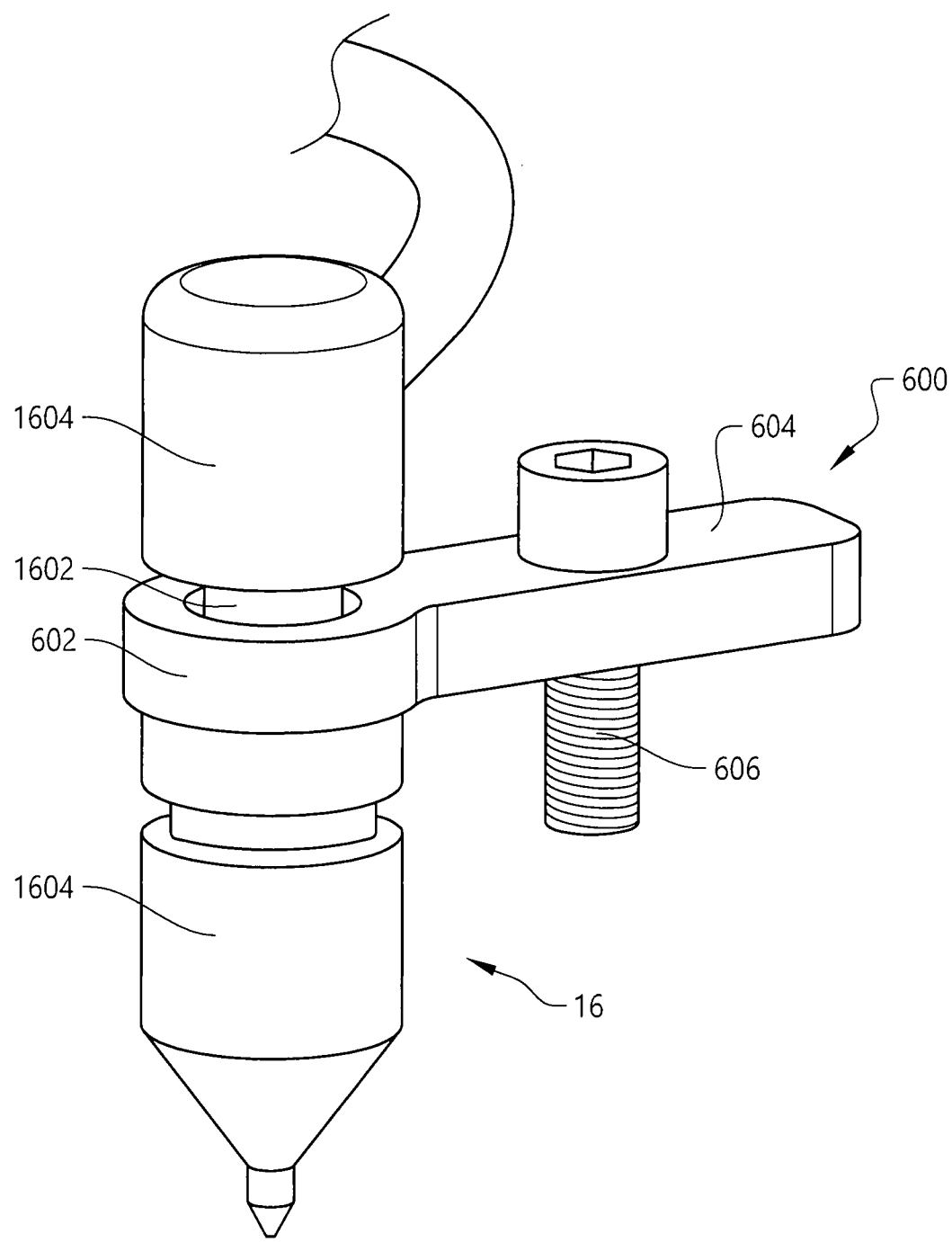
FIG. 6 is a schematic, perspective view of a yoke in accordance with at least one example embodiment of the invention.

The device 10 may further comprise a plurality of yokes 600, typically one for each injector body 16 of the one-piece module 12, i.e. usually four or six in total. An exemplary yoke 600 and injector body 16 is shown in FIG. 6. The yoke 600 is made in one piece (i.e. the yoke 600 consists of or is made in a single undivided piece) by additive manufacturing, for example as described above in relation of the one-piece module 12. The yoke 600 can be made of the same material as the one-piece module 12, for example titanium or (stainless) steel. The yoke 600 comprises a cylindrical portion 602 and an attachment portion 604. The attachment portion 604 is attachable to the engine 106 or an engine component. The attachment portion 604 may for example comprise at least one opening for at least one screw or bolt 606, allowing attachment to the engine 106 or an engine component, but alternative designs of the attachment portion are envisaged. As further shown in FIG. 6, the injector body 16 comprises a portion 1602 which is thinner than the longitudinally surrounding portions 1604, wherein the cylindrical portion 602 of the yoke 600 is loosely fitted around the thinner portion 1602 but caged between the surrounding portions 1604. Namely, the inner diameter of the cylindrical portion 602 of the yoke 600 is greater than the outer diameter of the thinner portion 1602 but smaller than the outer diameter of the surrounding portions 1604 of the injector body. Furthermore, the height of the cylindrical portion 602 of the yoke 600 is smaller than the distance between the longitudinally separated surrounding portions 1604 of the injector body. Hence, the yoke 600 is allowed to have a limited movement (rotation and translations) relative to the injector body 16.

Preferably, the cylindrical portion 602 of the yoke 600 is built around the thinner portion 1602 of the injector body 16 during the additive manufacturing of the yoke 600. Also, the one-piece module 12 and the yokes 600 are preferably manufactured (3D-printed) simultaneously. There has to be not physical link between the injector body 16 and the yoke 600, neither during manufacturing nor in the final product (e.g. device 10). Instead of "integrated" yokes 600, the one-piece module 12 could be used with conventional yokes.

Figure 7:
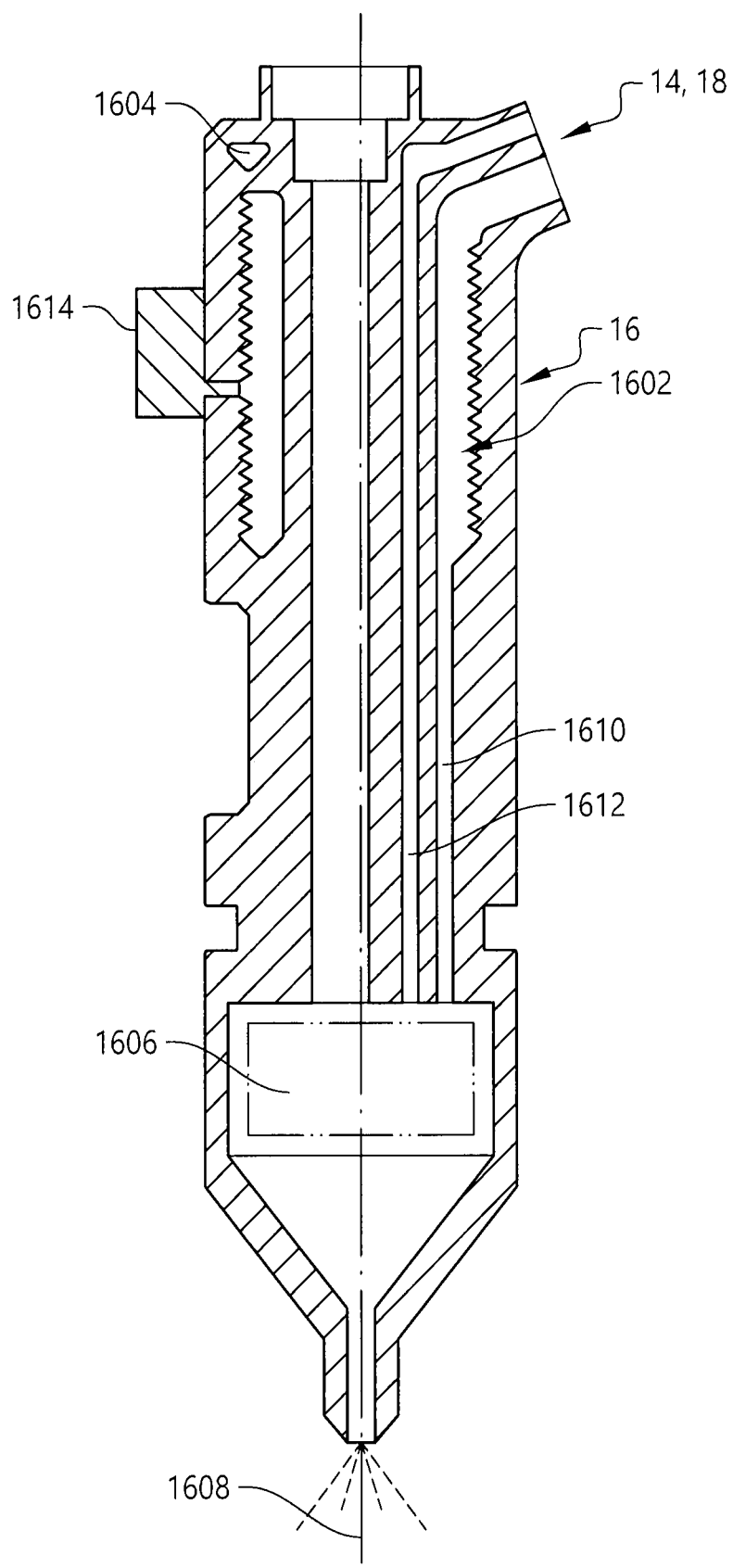
FIG. 7 is a schematic, cross-sectional view of an injector body in accordance with at least one example embodiment of the invention.

Each of the injector bodies 16 may include a first internal high-pressure fuel reserve cavity 1602, and optionally a second internal low-pressure fuel cavity 1604, as illustrated in FIG. 7 for one of the injector bodies 16. The first internal high-pressure fuel reserve cavity 1602 is for supplying fuel to an injector nozzle 1606 attached to the injector body 16, and the second internal low-pressure fuel cavity 1604 is for injector leakages. The first internal high-pressure fuel reserve cavity 1602 may be toroidal-shaped and arranged about the longitudinal axis 1608 of the injector body 16. The second internal low-pressure fuel cavity 1604 may be ring-shaped and arranged about the longitudinal axis 1608 of the injector body 16. Furthermore, the first internal high-pressure fuel reserve cavity 1602 may be arranged between the injector nozzle 1606 and the second internal low-pressure fuel cavity 1604, as seen in the longitudinal direction (axis 1608) of the injector body. In other words, the first internal high-pressure fuel reserve cavity 1602 is arranged closer to the injector nozzle 1606 than the second internal low-pressure fuel cavity 1604. The second internal low-pressure fuel cavity 1604 may be arranged at the top of the injector body 16. Furthermore, the first high-pressure fuel reserve cavity 1602 may be bigger than the second low-pressure fuel cavity 1604. The first high-pressure fuel reserve cavity 1602 may for example have a volume of about 15 cc, whereas the second low-pressure fuel cavity 1604 may have a volume of about 2 cc. Furthermore, the first high-pressure fuel reserve cavity 1602 may be fluidly connected on one hand, to the high-pressure inlet channel 1402 of the common fuel line 14 (possibly via any individual fuel line 18), and on the other hand to the injector nozzle 1606 via a lower channel 1610. Likewise, the second low-pressure fuel cavity 1604 may be fluidly connected to the low-pressure return channel(s) 1404 of the of the common fuel line 14 (possibly via any individual fuel line 18), and on the other hand to the injector nozzle 1606 via another lower channel 1612. Furthermore, the first high-pressure fuel reserve cavity 1602 may be designed as an anechoic chamber, to align (or reduce) pulses of pressure with the injection. Furthermore, an accelerometer sensor 1614 may be added, to allow better command of the injection.

Figure 8:
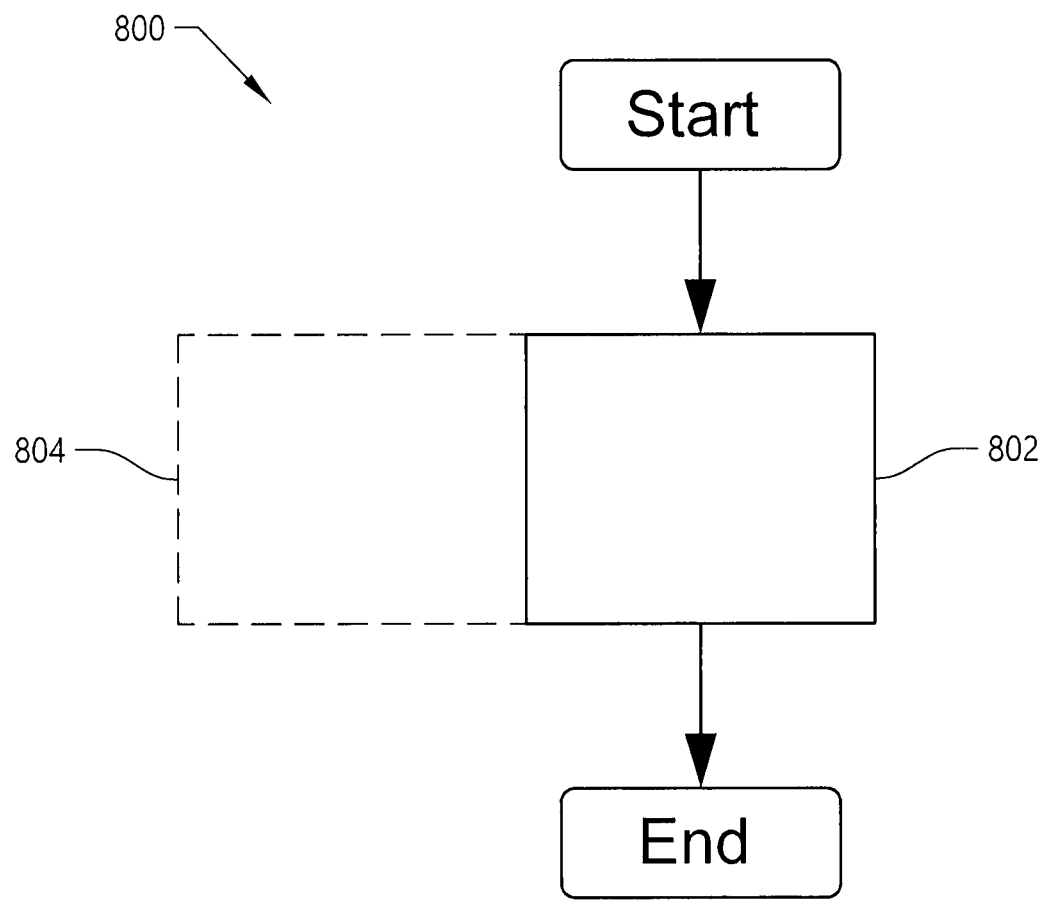
FIG. 8 is a flow chart of a method for manufacturing the device.

FIG. 8 is a flow chart of a method for manufacturing the device 10. for a common rail fuel injection system. The method comprises the step 802 of additively manufacturing the one-piece module 12 (of the device 10), which one-piece module 12 at least comprises the common fuel line 14 and the injector bodies 16. Possible details of the additive manufacturing have been explained above.

The method may according to some embodiments comprise the step 804 of additively manufacturing the yokes 600. Preferably, this step is performed simultaneously as step 802, as indicated in FIG. 8. Alternatively, the yokes 600 could be manufactured after step 802.

It is to be understood that the present invention is not limited to the embodiments described above and illustrated in the drawings; rather, the skilled person will recognize that many changes and modifications may be made within the scope of the appended claims. For example, instead of a truck, the vehicle may be another heavy vehicle or it may be a car. The common rail fuel injection system may not only be used for diesel; it may also be used for gasoline.

Furthermore, the common fuel line with the high-pressure inlet channel and the at least one low-pressure return channel may be an invention on its own. Hence, there is envisaged a common fuel line comprising a high-pressure inlet channel and at least one low-pressure return channel, wherein the common fuel line is made (in one piece) by additive manufacturing. This common fuel line may further have any feature described and/or shown herein, in particular in relation to the common fuel line 14.

Furthermore, the connector may be an invention on its own. Hence, there is envisaged a connector connectable to one end of a line (for example common fuel line 14) comprising a first channel (for example high-pressure inlet channel 1402) and at least one second channel (for example low-pressure return channel(s) 1404), wherein the connector comprises a first central passage adapted to transport a first fluid (for example high-pressure fuel) to/from the first channel of said line and at least one second peripheral passage adapted to transport a second fluid (for example (low-pressure) fuel) to/from the at least one second channel of said line, wherein the transition between the first central passage and the first channel is sealed by a conical connection, and wherein the transition between the at least one second peripheral passage and the at least one second channel is sealed by at least one O-ring and a nut, which nut interconnects the connector and said end of said line. This connector may further have any feature described and/or shown herein, in particular in relation to the connector 500. The connector can also be used in other applications than the application described above, such as managing gas (or gasoline) and diesel supply for a dual fuel system.

Furthermore, the yokes may be an invention on their own. To this end, there is envisaged an injector comprising an injector body and a yoke, wherein the yoke comprises a cylindrical portion and an attachment portion attachable to an engine or engine component, wherein the injector body has a portion which is thinner than surrounding portions of the injector body, wherein the cylindrical portion of the yoke is loosely fitted around said portion but caged by said surrounding portions of the injector body, and wherein the yoke is made in one piece by additive manufacturing. This injector may further have any feature described and/or shown herein, in particular in relation to the injector bodies 16 and yokes 600.

Furthermore, the internal high-pressure fuel reserve cavity may be an invention on its own. To this end, there is envisaged an injector comprising an injector body including an internal high-pressure fuel reserve cavity, wherein the injector body including the internal high-pressure fuel reserve cavity is made (in one piece) by additive manufacturing. This injector may further have any feature described and/or shown herein, in particular in relation to the internal fuel cavity 1602.

The invention claimed is:

1. A device for a common rail fuel injection system, characterized in that the device comprises a one-piece module which is made of one of metal or alloy, and which comprises a common fuel line and a plurality of injector bodies in fluid communication with the common fuel line, each injector body comprising an injector nozzle, and extending from the common fuel line to the injector nozzle, and wherein each of the injector bodies includes an internal high-pressure filet reserve cavity configured to store a volume of fuel.

2. A device according to claim 1, wherein the one-piece module is made by additive manufacturing.

3. A device according to claim 1, wherein the common fuel line has at least one curved portion between each injector body.

4. A device according to claim 1, wherein the common fuel line has an undulating shape in a plane perpendicular to the longitudinal direction of each injector body.

5. A device according to claim 1, wherein the injector bodies are fluidly connected in series along the common fuel line.

6. A device according to claim 1, wherein the one-piece module further comprises a plurality of individual fuel lines, and wherein each individual fuel line is provided between the common fuel line and a respective injector body.

7. A device according to claim 6, wherein each individual fuel line comprises a channel with a local channel restriction adapted to act as a wave damper.

8. A device according to claim 1, wherein the common fuel line comprises a high-pressure inlet channel.

9. A device according to claim 8, wherein the common fuel line further comprises at least one low-pressure return channel.

10. A device according to claim 9, wherein the at least one low-pressure return channel is two low-pressure return channels, each at least partly surrounding the high-pressure inlet channel in a circumferential direction.

11. A device according to claim 9, further comprising a connector connected to one end of the common fuel line, wherein the connector comprises a first central passage adapted to deliver high-pressure fuel to the high-pressure inlet channel of the common fuel line and at least one second peripheral low-pressure passage adapted to receive fuel from the at least one low-pressure return channel of the common fuel line, wherein the transition between the first central passage and the high-pressure inlet channel is sealed by a conical connection, and wherein the transition between the at least one second peripheral low-pressure passage and the at least one low-pressure return channel is sealed by at least one O-ring and a nut, which nut interconnects the connector and said end of the common fuel line.

12. A device according to claim 1, wherein the device further comprises a plurality of yokes, wherein each yoke comprises a cylindrical portion and an attachment portion attachable to an engine or engine component, wherein each of the injector bodies has a portion which is thinner than surrounding portions of the injector body, wherein the cylindrical portion of each yoke is loosely fitted around said portion but caged by said surrounding portions of a respective injector body, and wherein each yoke is made in one piece by additive manufacturing.

13. A device according to claim 12, wherein the cylindrical portion of each yoke is built around said portion during the additive manufacturing of the yoke.

14. A vehicle comprising a device according to claim 1.

15. A device according to claim 1, wherein the one-piece module is made of titanium.

16. A device according to claim 1, wherein the one-piece module is made of stainless steel.

17. A method of manufacturing a device for a common rail fuel injection system, characterized by the step of:
additively manufacturing a one-piece module of the device, which one-piece module is made of metal or alloy, such as titanium or stainless steel and comprises a common fuel line and a plurality of injector bodies in fluid communication with the common fuel line, each injector body comprising an injector nozzle, and extending from the common fuel line to the injector nozzle, and each of the injector bodies including an internal high-pressure fuel reserve cavity allowing to store a volume of fuel.

18. A method according to claim 17, further comprising the step of:
additively manufacturing a one-piece yoke for each injector body, wherein each yoke comprises a cylindrical portion and an attachment portion attachable to an engine or engine component, and wherein the cylindrical portion of each yoke is built around a portion of the injector body which is thinner than surrounding portions of the injector body, such that the cylindrical portion of each yoke is loosely fitted around said portion but caged by said surrounding portions of the injector body.

19. A method according to claim 18, wherein the one-piece module and the yokes are manufactured simultaneously.

\* \* \* \* \*